(12) United States Patent
Flemming et al.

(10) Patent No.: US 9,021,206 B2
(45) Date of Patent: Apr. 28, 2015

(54) USE OF CACHE STATISTICS TO RATION CACHE HIERARCHY ACCESS

(75) Inventors: Diane G. Flemming, Pflugerville, TX (US); Brian C. Twichell, Austin, TX (US); Greg R. Mewhinney, Austin, TX (US); David B. Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 13/218,173

(22) Filed: Aug. 25, 2011

(65) Prior Publication Data

US 2013/0054897 A1    Feb. 28, 2013

(51) Int. Cl.
| G06F 12/00 | (2006.01) |
| G06F 13/00 | (2006.01) |
| G06F 13/28 | (2006.01) |
| G06F 12/08 | (2006.01) |
| G06F 12/12 | (2006.01) |

(52) U.S. Cl.
CPC .... G06F 12/0888 (2013.01); *G06F 2212/1021* (2013.01); *G06F 12/0842* (2013.01); *G06F 12/0897* (2013.01); G06F 12/128 (2013.01)

(58) Field of Classification Search
CPC .............. G06F 12/0888; G06F 12/128; G06F 12/0897; G06F 12/121; G06F 12/126; G06F 17/3048; G06F 2212/6042; G06F 2212/6046; G06F 12/0842; G06F 12/0811; G06F 2212/1021; G06F 2212/502
USPC .................................................. 711/118, 122
See application file for complete search history.

(56) References Cited

U.S. PATENT DOCUMENTS

| 6,591,347 | B2 * | 7/2003 | Tischler et al. ............... 711/134 |
| 7,454,571 | B1 * | 11/2008 | Sucharitakul ................. 711/129 |
| 7,475,194 | B2 | 1/2009 | Accapadi et al. |
| 7,512,837 | B1 | 3/2009 | Flemming et al. |
| 7,558,920 | B2 | 7/2009 | Mattina et al. |
| 7,603,522 | B1 * | 10/2009 | Lepak et al. ................... 711/130 |
| 7,711,905 | B2 | 5/2010 | Flemming et al. |
| 7,721,047 | B2 | 5/2010 | Dunshea et al. |
| 7,752,395 | B1 | 7/2010 | Fair et al. |
| 2005/0240735 | A1 | 10/2005 | Shen et al. |
| 2006/0123197 | A1 | 6/2006 | Dunshea et al. |
| 2007/0067578 | A1 * | 3/2007 | Kurichiyath .................. 711/141 |
| 2008/0183967 | A1 | 7/2008 | Speier et al. |
| 2009/0006036 | A1 | 1/2009 | Luick |
| 2009/0037664 | A1 * | 2/2009 | Kornegay et al. ............. 711/138 |

(Continued)

OTHER PUBLICATIONS

IBM TDB (Jan. 25, 2008). Prefetching data to the processor without polluting the L2 cache. IP.com No. IPCOM000166856D, pp. 1-2.

(Continued)

*Primary Examiner* — Matthew Bradley
*Assistant Examiner* — Rocio del Mar Perez-Velez
(74) *Attorney, Agent, or Firm* — Terrile, Cannatti, Chambers & Holland, LLP; Michael Rocco Cannatti

(57) ABSTRACT

A method, system and program are provided for controlling access to a specified cache level in a cache hierarchy in a multiprocessor system by evaluating cache statistics for a specified application at the specified cache level against predefined criteria to prevent the specified application from accessing the specified cache level if the specified application does not meeting the predefined criteria.

1 Claim, 3 Drawing Sheets

(56) References Cited

U.S. PATENT DOCUMENTS

| | | |
|---|---|---|
| 2009/0222625 A1 | 9/2009 | Ghosh et al. |
| 2010/0180083 A1 | 7/2010 | Lee et al. |
| 2010/0262786 A1 | 10/2010 | Cummings et al. |
| 2011/0022803 A1 | 1/2011 | Flemming et al. |
| 2011/0107031 A1 | 5/2011 | Anand et al. |

OTHER PUBLICATIONS

Memik, G. et al. (2003). Reducing energy and delay using efficient victim caches, Proceedings of the 2003 International Symposium on Low Power Electronics and Design (ISLPED '03), 262-265, Doi: 10.1109/LPE.2003.1231873, See section 4.4 on p. 264.

Asaduzzaman, A. et al. (2010). Evaluation of the impact of Miss Table and victim caches in parallel embedded systems. 2010 International Conference on Microelectronics (ICM), 144-147, Doi: 10.1109/ICM.2010.5696100.

Yang, C. al. (Dec. 2010), Fine-grained adaptive CMP cache sharing through access history exploitation, IEEE, Proceedings of the 2010 18th IEEE/IFIP International Conference on VLSI and System-on-Chip, VLSI-SoC 201, 420-425.

\* cited by examiner

USE OF CACHE STATISTICS TO RATION CACHE HIERARCHY ACCESS

BACKGROUND OF THE INVENTION

1. Field of the Invention

The present invention is directed in general to the field of data processing systems. In one aspect, the present invention relates to cache memory management in data processing systems.

2. Description of the Related Art

As infrastructure costs continue to rise along with administration and support costs, customers are looking to reduce costs by consolidating infrastructure onto third party infrastructure (e.g., clouds) which provides the computing power without additional administration and support costs. However, there are challenges presented by consolidating workloads onto shared computing infrastructure without impacting performance. For example, cache performance can be seriously degraded by consolidating data from multiple disparate applications onto a single computing infrastructure when each application is forced to re-establish its memory footprint at each level of the cache hierarchy at dispatch time. While attempts have been made to control cache behavior and improve cache efficiency by moving cached data from one cache memory/location to another based on the use of that instance of the cached data, such solutions can result in inefficient allocation of cache resources in a cache hierarchy.

SUMMARY OF THE INVENTION

A computer implemented method, system, and computer usable program code are provided using memory usage statistics to manage data in a plurality of storage locations by rationing or limiting access by different applications to different storage locations based on demonstrated need for the data. In selected embodiments where the storage locations are different cache memory levels, cache hierarchy contention may be reduced by rationing access to a given cache level to those applications demonstrating a need for cached data based on cache statistics for the different applications. In other embodiments, a memory management tool is provided as a software service which optimizes performance by allocating application data to only those cache memory levels which cache statistics indicate will likely be used by the application data. The memory management tool responds to a request to move data associated with an application from a first cache level (e.g., L1) to a lower cache level by searching cache statistics for the next lower cache level to see if the application is using the next lower cache level above a minimum activity threshold. If the threshold activity is met, the data associated with the active application may be cast off to the next lower cache level. Otherwise, access to the next lower cache level is blocked or prevented, and the application data is moved to another lower cache or memory level. Alternatively, the memory management tool responds to a request to move data associated with an application from a first cache level (e.g., L1) to a lower cache level by searching a table which identifies a next lower cache level for the given application. The next lower cache level for each application is specified in the table by periodically collecting statistics for each application at each cache level (e.g., data on cache misses, hits, references, etc. for every level of the cache hierarchy), and then using the collected cache statistics to determine if the data references from one or more of the lower cache levels exceed a predetermined threshold. If there is sufficient use of the application at the next adjacent lower cache level (e.g., L2) (e.g., the predetermined threshold is met), then the next adjacent lower cache level (e.g., L2) may be specified in the table as the next lower cache level for the given application. However, if there is not sufficient use of the application at the next adjacent lower cache level (e.g., the predetermined threshold is not met), then the next adjacent lower cache level (e.g., L2) is not specified in the table as the next lower cache level for the given application, thereby blocking the application from populating the next adjacent lower cache level and preserving existing data in the next adjacent lower cache level. As seen from the foregoing, the memory management tool may populate a table with "next level" identifiers for each application based on cache statistics, or may instead be implemented as an algorithm on the fly to determine the next or lower cache level by comparing the cache statistics to a threshold requirement.

In accordance with various embodiments, access to a cache hierarchy is controlled in a multiprocessor data processing system under software and/or hardware control using the methodologies and/or apparatuses described herein, which may be implemented in a data processing system with computer program code comprising computer executable instructions. In whatever form implemented, cache statistics are collected for a first application at a first cache level, such as by collecting data on cache misses, cache hits, and/or cache references for the first cache level of the cache hierarchy. In selected embodiments, cache statistics are repeatedly collected for a plurality of applications at the first cache level in a multiprocessor system that shares access to the first cache level. The collected cache statistics are evaluated according to predefined criteria. Upon detecting that the first application does not meet the predefined criteria, the first application is prevented from accessing the first cache level, such as by blinding the first application to the existence of the first cache level. For example, if the first cache level is a victim cache populated only with cast-offs from a higher cache level, the cache statistics are evaluated by determining if the cache hit rate for the first application at the victim cache is less than a predefined threshold which may be tunable. As another example, if the first cache level is a shared cache level, the cache statistics may be evaluated by determining if the cache hit rate for the first application at the shared cache is less than a predefined threshold.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
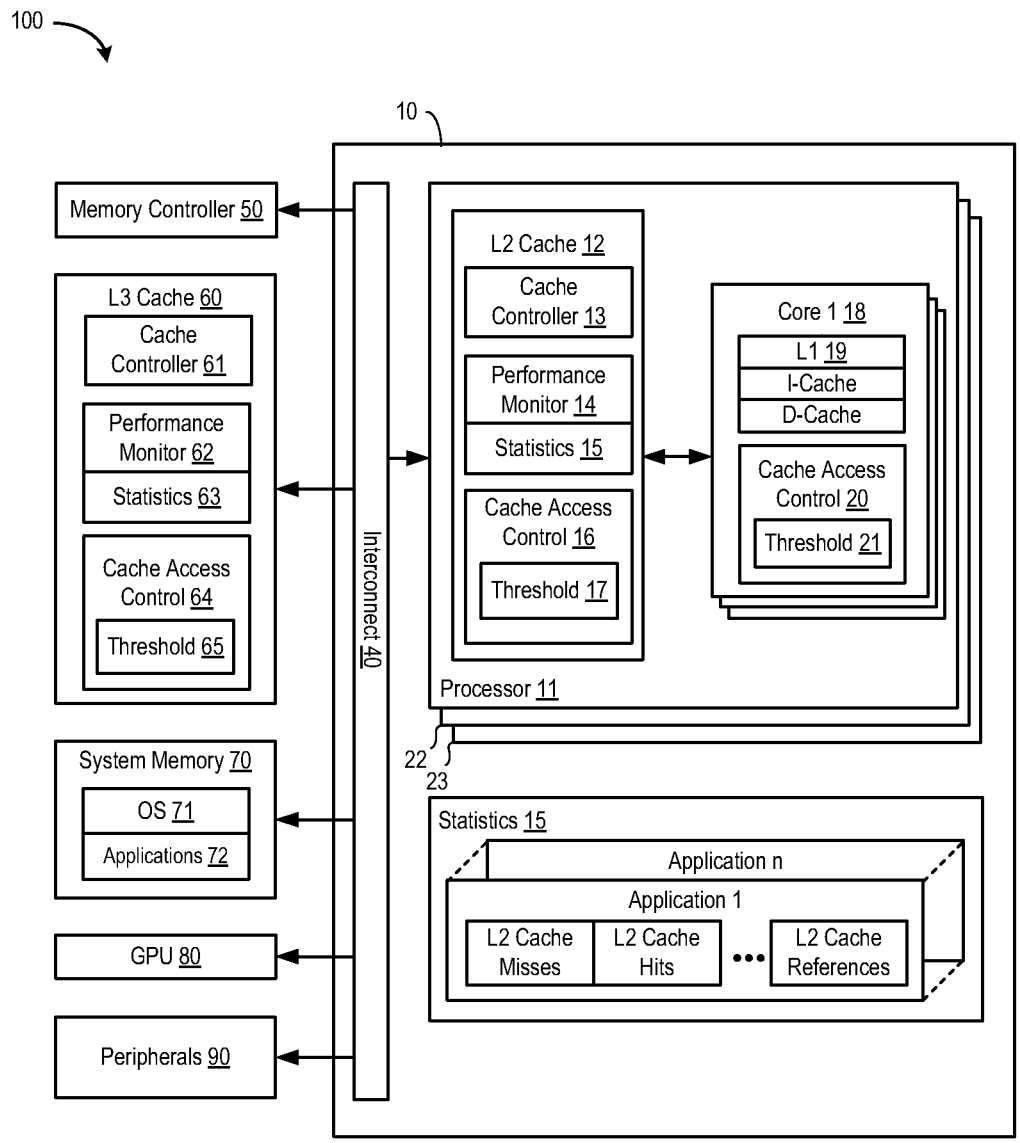
FIG. 1 is a block diagram of a data processing system in which illustrative embodiments may be implemented.

A cache management method, system, and program are disclosed for controlling access to different cache/memory levels by caching data from an application based on the application's demonstrated need for a different cache/memory level. To determine which applications have access to which cache memory level, cache statistics are collected for each application at each cache/memory level using any desired performance monitor technique. For example, one or more hardware counter mechanisms may be used to collect data for each application on cache misses, hits, references, etc. for one or more predetermined cache levels of the cache hierarchy. Depending on the frequency or rate of data collection, the cache statistics can be reactive to sudden changes in the application behavior (e.g., when collected at frequent intervals) or collected less frequently to indicate an average of application behavior (e.g., when collected infrequently). In multi-level cache systems where a lower level cache (e.g., a victim cache or shared cache) is populated with cache data from a higher level cache, the cache statistics for the lower level cache are analyzed to determine how often data from a particular application is referenced from the lower level cache. If there is not sufficient use of the lower level cache by the application (e.g., as determined by comparison to a tunable threshold), the application will not be allowed to populate the lower level cache, thereby preserving data in the lower level cache. Conversely, if the cache statistics indicate that the application has demonstrated a need for the data from the lower level cache (e.g., based on the comparison to the tunable threshold), the application is allowed to populate the lower level cache. In this way, the cache statistics are used to ration individual cache levels to those applications demonstrating a need for cached data.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Referring to FIG. 1, there is shown a block diagram of a data processing system 100 in which selected embodiments may be implemented to control cache access and reduce cache contention. The depicted embodiments are not meant to imply architectural limitations, and may be implemented as a computer-based method, apparatus, and computer usable program code for compiling source code and for executing code. The depicted data processing system 100 has one or more processing units arranged in one or more processor groups, such as shown with the four processing units 11, 22, 23 in processor group 10. The processing units communicate with other components of system 100 via a system or fabric bus 40. Fabric bus 40 is connected to a memory controller 50, a shared or L3 system cache 60, a system memory device 70, a graphical processing unit (GPU) 80, and/or various peripheral devices 90. Though not shown, it will be understood that the data processing system 100 may also include firmware which stores the system's basic input/output logic, and seeks out and loads an operating system from one of the peripherals whenever the computer system is first turned on (booted). Although depicted as off-chip, it is understood that an on-chip L3 hardware implementation can also take advantage of this invention.

Once loaded, the system memory device 70 (random access memory or RAM) stores program instructions and operand data used by the processing units, in a volatile (temporary) state, including the operating system 71 and application programs 72. In addition, any peripheral device 90 may be connected to fabric bus 40 using any desired bus connection mechanism, such as a peripheral component interconnect (PCI) local bus using a PCI host bridge. Example peripheral devices 90 may include, for example, a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and/or a graphical pointing device (e.g., mouse) for use with the display device.

In a symmetric multi-processor (SMP) computer implementation of the data processing system 100, all of the processing units 11, 22, 23 are generally identical, that is, they all use a common set or subset of instructions and protocols to operate, and generally have the same architecture. As shown with processing unit 11, each processing unit may include one or more processor cores 18 which carry out program instructions in order to operate the computer. An exemplary processing unit would be the processor products marketed by IBM Corporation which comprise a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture, though other instruction sets and/or processing architectures may be used.

Each processor core 18 includes an on-board (L1) cache memory 19 (typically, separate instruction and data caches) that is constructed from high speed memory devices. Caches are commonly used to temporarily store values that might be repeatedly accessed by a processor, in order to speed up processing by avoiding the longer step of loading the values from system memory 70. A processing unit can include another cache such as a second level (L2) cache 12 which, along with a cache memory controller 13, supports the one or more cores 18. Additional cache levels may be provided, such as an L3 cache 60 which is accessible via fabric bus 40 in this example. Each cache level, from highest (L1) to lowest (L3) can successively store more information, but at a longer access penalty. For example, the on-board L1 caches (e.g., 19) in the processor cores (e.g., 18) might have a storage capacity of 128 kilobytes of memory, L2 cache 12 might have a storage capacity of 4 megabytes, and L3 cache 60 might have a storage capacity of 32 megabytes. To facilitate repair/replacement of defective processing unit components, each processing unit 11, 22, 23 may be constructed in the form of a replaceable circuit board, pluggable module, or similar field replaceable unit (FRU), which can be easily swapped, installed in, or swapped out of data processing system 100 in a modular fashion.

In a data processing system 100 with a multi-level cache hierarchy, each cache level (e.g., L1, L2, L3, etc.) provides reduced latency data and/or instruction storage for the processor cores as compared to the access times for storage in main memory 70. Thus, the primary L1 cache 19 is the fastest memory because it is closest to the processor 18. The next cache level is the secondary L2 cache 12 which is a secondary staging area that may serve as a shared cache for the L1 caches 19 in the core(s) 18 or otherwise serve as a victim cache for the L1 caches 19. Given its relative position in the cache hierarchy, the L2 cache 12 is slower than the L1 cache 19 but faster than main memory 70. The L2 cache 12 may be built into the processor chip 10 or may reside on a separate chip on the motherboard. If the L2 cache 12 is built into the processor chip, then the next cache level may be a Level 3 (L3) cache 60 on the motherboard which feeds the L2 cache 12 on the processing unit 11, along with any additional L2 caches on the processing units 22, 23. In the processing unit 22, the L2 cache 12 feeds the L1 cache 19, which feeds the processor 18. Given its relative position in the cache hierarchy, the L3 cache 60 is slower than the L2 cache 12 but faster than main memory 70.

The cache hierarchy is used to provide low latency storage of data/instructions from main memory 70. When a processor 18 needs data from main memory 70, the needed data is brought into a higher level cache (e.g., L1 or L2). If space is not available to accommodate the data, a cache replacement mechanism chooses other data to be replaced, and moves that data out of the higher level cache into the adjacent cache at the next level (e.g. L3 cache 60). If the processor 18 again needs that data, then that data is moved back into the higher level cache from the L3 cache 60. On the other hand, if the space consumed by that data in L3 cache 60 needs to be reused, then that data is moved out of the L3 cache 60 back into main memory 70.

To manage the storage of data in a cache, each cache includes a cache controller, such as L2 cache controller 13 and L3 cache controller 61. The cache controller implements, among other functions, a cache replacement mechanism, such as a Least Recently Used (LRU) algorithm, to replace or cast off a cache line in the higher level cache that the processor has not referenced or accessed for the longest period of time. Conventionally, a cache controller (e.g., L2 cache controller 13) seeking to remove or replace a cache line from its cache level (e.g., L2 cache 12) would cast off, transfer or evict the cache line to the next, adjacent cache level (e.g., L3 cache 60), which in turn might require the cache controller (e.g., L3 cache controller 61) to evict a cache line from its cache level (e.g., L3 cache 60) to a lower level cache or main memory. As a result, the cascading effect of one cache eviction after another creates cache contention problems that disrupt the behavior of the cache hierarchy. These problems are only exacerbated when multiple different applications are using the cache hierarchy.

To control or reduce cache hierarchy contention, a cache level may include a cache access control which controls access to the next cache level based on historical behavior, thereby rationing the next cache level to those applications demonstrating a need for cached data. In an example embodiment shown in FIG. 1, the L1 cache 19 includes a cache access control module and/or circuit 20 which controls the destination for cache lines evicted from the L1 cache 19 based at least in part on cache statistics 15 for the next level L2 cache 12 collected by the performance monitor 14. In operation, the cache access control 20 responds to a request to move data associated with a particular application, such as a cache line, from the L1 cache 19 to a storage location, such as a lower level cache (e.g., L2 cache 12) by accessing cache statistics 15 at the L2 cache 12. The L2 cache statistics 15 are assembled for each application (1-$n$) to provide a measure of how much each application is using the L2 cache. To this end, the L2 cache statistics 15 may be assembled by a hardware counter mechanism or other performance monitor 14 which monitors and collects performance-related data for the L2 cache 12, such as L2 cache misses, L2 cache, L2 references, etc. With this statistical use information, the L1 cache access control 20 determines whether to use or bypass the L2 cache 12 for the evicted L1 cache line(s). In an example implementation, the L1 cache access control 20 compares an activity threshold value 21 to the L2 cache statistics 15 associated with the application. If the comparison to the threshold 21 indicates there is not sufficient use of the L2 cache level 12 by the associated application (e.g., the activity measure does not meet the threshold), the evicted L1 cache line for that application will not be allowed to populate the L2 cache 12, thereby preserving existing data.

One metric that could be used to govern usage of a particular level of cache is cycles per reclaim. A 'reclaim' is where a piece of data in a cache is reused. Higher values of cycles per reclaim mean that data is being reused less often, and would tend to discourage use of a particular cache level, while lower values of cycles per reclaim mean that data is being reused more often, and would tend to encourage use of a particular level of cache. With this in mind, an application would be denied use of a cache if its cycles per reclaim from that cache was higher than a particular value. Consideration must be given on how to initialize the algorithm and adjust for changes in program behavior over time. One way would be to use zero as the starting value for an application's cycles per reclaim, and to measure cycles per reclaim periodically over time. An exponential decay mechanism could be used to favor usage of more recent measures of cycles per reclaim.

In similar fashion, the L2 cache 12 may include a cache access control 16 which controls the destination for cache lines evicted from the L2 cache 12. In operation, the cache access control 16 receives a request from the L2 cache controller 13 to move data, such as a cache line, from the L2 cache 12 to a storage location, such as a lower level cache (e.g., L3 cache 60) or a main memory 70. In response, the cache access control 16 accesses cache statistics 63 for the next level L3 cache 60 collected by the performance monitor 62. The L3 cache statistics 63 assembled for each application (Applications 1-$n$) provide a measure of how much each application is using the L3 cache 60. By comparing an activity threshold value 17 to the L3 cache statistics 63 associated with the application, the cache access control 16 determines whether to use or bypass the L3 cache 60 for the evicted L2 cache line(s). Of course, if the L3 cache controller 61 determines that an L3 cache line should be evicted, the L3 cache access control 64 may also compare an activity threshold value 65 to cache statistics for the next level of cache (not shown) to determine whether to block the next level of cache.

As seen from the foregoing, the historical behavior for each application at a "next" cache level may be used at a "higher" cache level to conditionally allow or forbid storage of data from the "higher" cache level at the "next" cache level, thereby reducing the cache contention. The historical behavior may be collected at regular or predetermined intervals as statistical data for the "next" cache level, including cache misses, hits, and references for every level of the cache hierarchy. When the "next" cache level is a victim cache which is populated by the cast off data from a higher level of cache, the cache statistics for the victim cache may be compared to an activity threshold value to determine how much data from an application is being referenced from the victim cache so that the victim cache is populated only if the application usage of the victim cache exceeds the activity threshold value. Otherwise, access from the higher level cache to the victim cache is blocked, locked, aborted, excluded, or precluded or otherwise prevented until the victim cache activity meets the activity threshold value. Selected embodiments may also be used with systems having shared caches which operate in the standard manner by using the same set of cache statistics to deny use of the shared cache level. For example, with shared cache memories (e.g., L4 cache memories) that are used for applications requiring a large, shared data set, it would only take the dispatch of a single, rarely used application from the L3 cache to perturb the footprint enough to affect caching behavior at the L4 level. But by tracking the cache activity level of each application at the L4 cache, the L3 cache access control would have statistics indicating the relatively low usage of the L4 cache by the single application, in which case the single application would be blinded to the existence of the shared L4 cache and would never populate that level.

Figure 2:
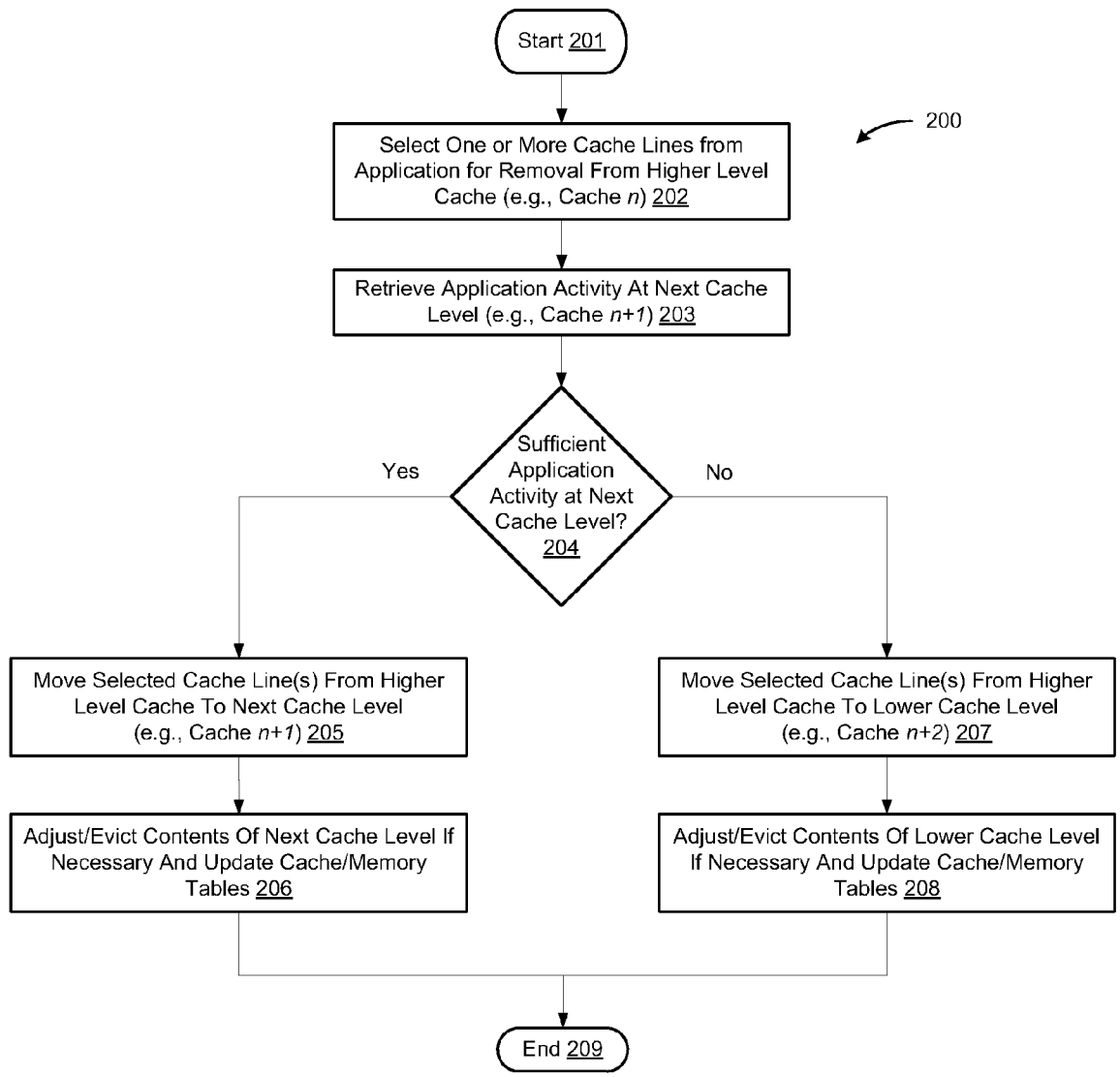
FIG. 2 is a logical flowchart illustrating an exemplary process for removing data from a cache memory in accordance with selected embodiments.

To further illustrate selected embodiments of the present invention, reference is now made to FIG. 2 which shows a logical flowchart illustrating an exemplary process 200 for removing data from a cache memory in accordance with selected embodiments. At step 201, the process starts, such as when a requesting core or processor is running a program or application that loads data from a higher level cache memory (e.g., cache n). When space is required in the higher level cache, the cache n controller selects one or more cache lines associated with an application for removal from the higher level cache (step 202). However, before evicting the selected cache line(s), the cache n controller (or associated cache access control) retrieves or accesses information concerning the application activity at the next, adjacent cache level (cache n+1), such as by accessing cache statistics from cache n+1 for the application associated with the selected cache line(s).

At decision step 204, it is determined if there is sufficient activity by the subject application at the next, adjacent cache level (cache n+1). This determination may be made by comparing the relevant activity measure from the historical cache statistics at cache n+1 for the subject application to a threshold value, which may be fixed or adjustable. At this juncture, it will be appreciated that the accumulation or assembly of cache statistics for the applications at the next cache level may be proceeding as a background process that is performed by a performance monitor for the next cache level which periodically collects or accumulates cache statistics for each application at the next cache level, such as by using a hardware counter mechanism to count cache misses, hits, references, etc. for every level of the cache hierarchy, and then storing the statistics in a cache directory or dedicated statistics table.

If there is sufficient application activity (affirmative outcome to decision 204), the cache controller moves or evicts the selected cache line(s) to the next, adjacent cache level (cache n+1) (step 205). In addition, any required adjustments or evictions of the contents of the next, adjacent cache level or memory are then made (step 206), and the process ends (step 209) or reverts back to the beginning (step 201).

On the other hand, if there is not sufficient application activity (negative outcome to decision 204), the cache controller bypasses the next, adjacent cache level (cache n+1), and instead moves or evicts the selected cache line(s) to a lower cache level (e.g., cache n+2) (step 207). In addition, any required adjustments or evictions of the contents of the lower cache level or memory are then made (step 208), and the process ends (step 209) or reverts back to the beginning (step 201).

The ability to block or bypass access by a particular application to a lower level cache based on historical use statistics for the application can be beneficially applied in a number of settings. For example, with data processing systems having multiple levels of cache hierarchy, a lower level cache may act as a victim cache for a higher level cache. For example, the L3 cache may serve as a victim cache for the L2 cache when the L3 victim cache is used to hold only cache lines that are removed, or evicted, from the L2 cache. A problem with the victim cache design is that when a cache line is brought into the L2 cache and eventually evicted from the L2 cache, that cache line is placed in the L3 victim cache before being cast out to main memory. However, if the first application streams through data that brings a set of cache lines through the L3 victim cache that the processor accesses just once, this data streaming may perturb the working cache line set, or footprint, of other applications being serviced by the L3 victim cache. By using the cache statistics at the L3 victim cache to block the first application from accessing the L3 victim cache if sufficient need is not demonstrated, an existing useful footprint of one or more other applications in the L3 victim cache are retained and not disrupted by the first application, thereby improving the data processing system's overall performance level by decreasing the amount of time required to access the necessary data. Illustrative embodiments are able to retain the existing application footprint(s) by recognizing that the first application has not used the L3 victim cache above a predetermined threshold.

The ability to block or bypass access to a lower level cache may also be beneficially applied with multi-level cache hierarchies which include a shared cache memory which is used for applications requiring large data set. By using the cache statistics to deny access to the shared cache by an application which rarely uses the shared cache, disruption of the large application's footprint in the shared cache is prevented.

Figure 3:
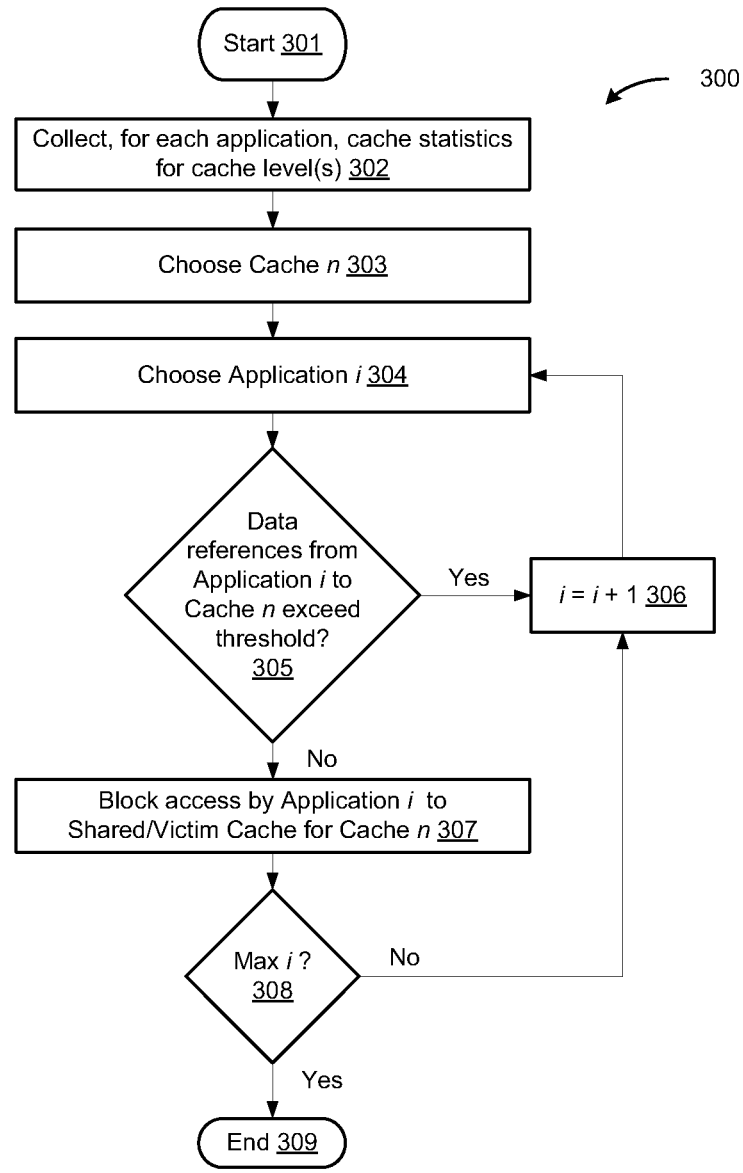
FIG. 3 is a logical flowchart illustrating an exemplary process for controlling cache hierarchy contention in accordance with selected embodiments.

As described herein, access to the cache hierarchy may be controlled at any specified cache level by collecting cache statistics at the specified cache level for each application and by positioning cache access control functionality at a higher cache level which analyzes the collected cache statistics and blocks application access to the specified cache if the cache statistics meet predefined criteria. In addition, it will be appreciated that the cache access control techniques may be applied at a system level by positioning the cache access control functionality across any or all cache levels in a data processing system, including a centralized or consolidated cache access control module (e.g., located at the memory controller or on the processing unit). In connection with such system level embodiments, reference is now made to FIG. 3 which depicts a logical flowchart illustrating an exemplary process 300 for controlling cache hierarchy contention in accordance with selected embodiments. The process 300 may be implemented in a memory or cache controller, such as, for example, L1 cache controller, L2 cache controller 13 or memory controller 50 in FIG. 1.

The process begins at step 301 as a background process that collects or accumulates cache statistics for each application at one or more specified cache levels. In particular, performance statistics may be periodically collected at one or more cache levels for each application that is running (step 302). Any desired technique may be used to collect performance statistics for each application, including but not limited to including using a performance monitor with event detection and control logic, including counters, control registers, multiplexers, and the like that is configured to collect and analyze data related to the execution of instructions, interaction between the processor cores and the memory hierarchy, and the like, to evaluate the performance of the system. Exemplary parameters computed by the performance monitor may include clock cycles per instruction (CPI), cache miss rates, Translation Lookaside Buffer (TLB) miss rates, cache hit times, cache miss penalties, and the like. In some embodiments, the performance monitor may be included in a processor core to monitor downstream cache activity, or may be included in one or more of the downstream cache levels.

To collect the necessary cache statistics, a first or target cache level (e.g., cache n) is initially chosen (step 303). The target cache level may be a victim cache or shared cache level in which access from higher level cache memory will be evaluated on the basis of demonstrated application activity at that cache level. Though not explicitly shown, it will be appreciated that each cache level in the system may be sequentially addressed by repeating the process described herein after incrementing the cache level to n+1.

To allocate the collected cache statistics between the applications running on the system, a first application (e.g., application i) is chosen (step 304) as an initial step. The application may be chosen by querying the specified first cache level (cache n) or an adjacent source cache level (cache n−1) for all applications which are currently using the queried cache level, organizing the identified applications in a sequential order, and then choosing a first application i=1.

At step 305, one or more predefined criteria or rules are applied to the cache statistics collected from the chosen cache n for the chosen application i to determine if the application is demonstrating a need for the chosen cache level. This determination is performed for each of the identified applications, as indicated by the incremental feedback loop (step 306) whereby the identified applications are sequentially chosen for evaluation against the predefined criteria or rules. For example, if the data references in the cache statistics from application i to cache n exceed a predetermined activity threshold value (affirmative outcome to decision 305), this signifies that application i is making adequate use of cache n so that there is no need to block access by application i to cache n. In this case, cache line evictions from the source cache level (cache n−1) to the target cache level (cache n) would be allowed, and the cache hierarchy would operate normally.

On the other hand, if the data references in the cache statistics from application i to cache n do not meet the predetermined activity threshold value (negative outcome to decision 305), this would signify that application i is not making adequate use of cache n. In this case, access by application i to cache n would be blocked (step 307) so that cache line evictions from the source cache level (cache n−1) to the target cache level (cache n) would not be allowed. The process of blocking access may be implemented on the fly as an algorithmic determination by the relevant cache access control functionality. Alternatively, the blocking process may be implemented by updating a cache directory table entry at the source cache level (cache n−1) to indicate that the cache level for cache evictions is a lower cache level (e.g., cache n+2). As a result of the blocking process, application i having data stored in a source cache level (cache n−1) may be prevented from accessing the cache n as a victim cache if the historical hit rate for application i at cache n is less than a predefined/tunable threshold. Similarly, application i may be prevented from accessing the cache n as a shared cache if the historical hit rate for application i at cache n is less than the predefined/tunable threshold.

The foregoing process is repeated for all identified applications, as indicated by step 308 where it is determined if the maximum number of identified applications have been evaluated. If not (negative outcome to decision 308), the application counter value i is incremented (step 306), and the process repeats. When all identified applications have been evaluated (affirmative outcome to decision 308), the process ends (step 309).

As will be appreciated by one skilled in the art, the present invention may be embodied in whole or in part as a method, system, computer program product or data processing system. Accordingly, the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the present invention may take the form of a computer program product or instructions on a computer readable medium having computer-usable program code embodied in the medium. For example, the functions of collecting cache statistics at a cache level for an application and/or evaluating those statistics against one or more predefined rules or criteria may be implemented in software that is stored in one or more cache levels or may be centrally stored in a single location.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for controlling access to a cache hierarchy, comprising:
    collecting cache statistics for a plurality of applications at every cache level of a multi-level cache using a hardware counter to periodically collect statistics on data cache misses, hits, and references for every level of the multi-level cache;
    evaluating the cache statistics for each of the plurality of applications against a predefined activity threshold for a victim cache level which is only populated with cast-offs from a higher level of the multi-level cache;
    preventing access to the victim cache level by a cache line from any application from the plurality of applications that does not meet the predefined activity threshold for the victim cache level; and
    moving the cache line from said application to a cache level below the victim cache level in the multi-level cache.

* * * * *